April 25, 1961

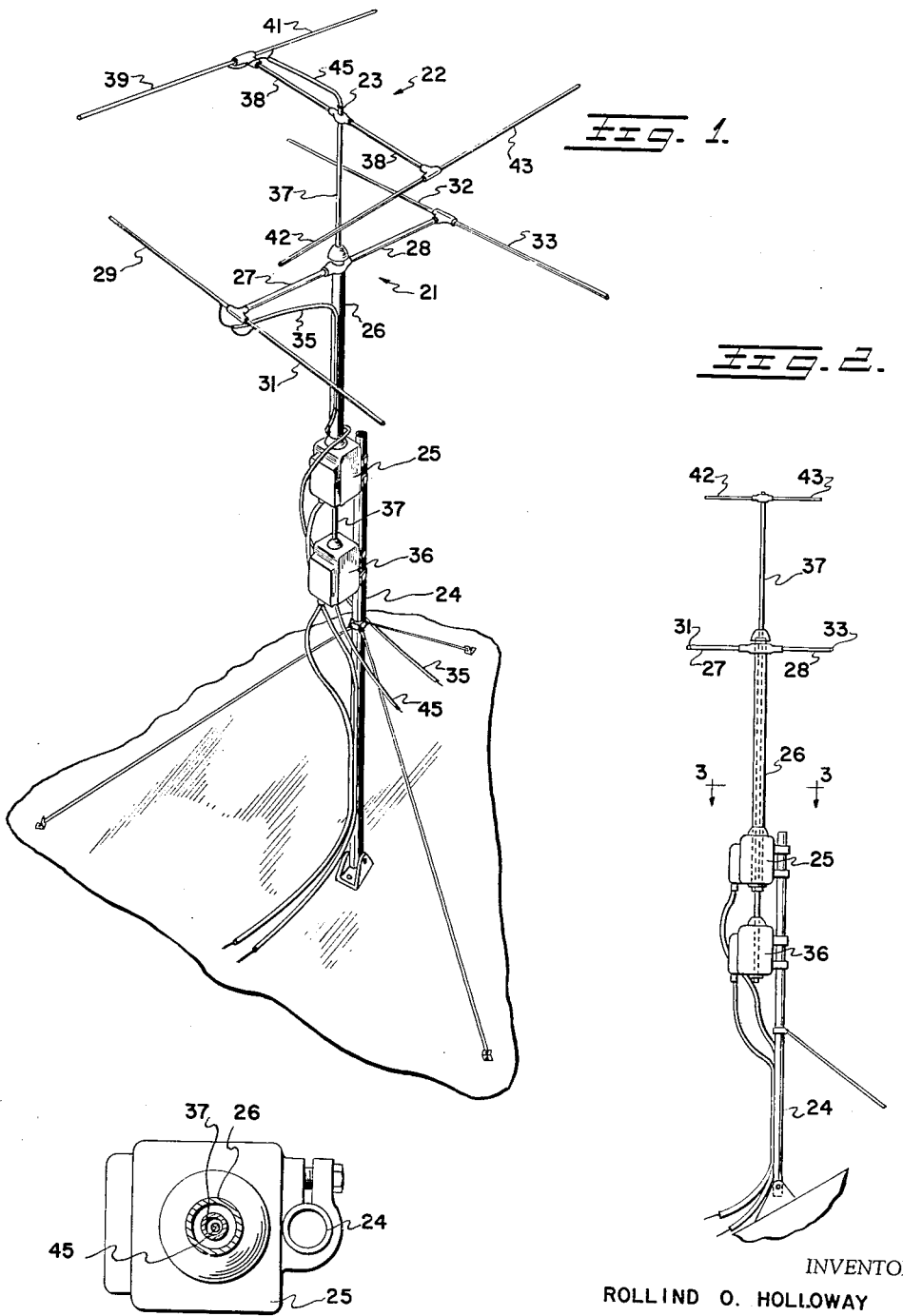

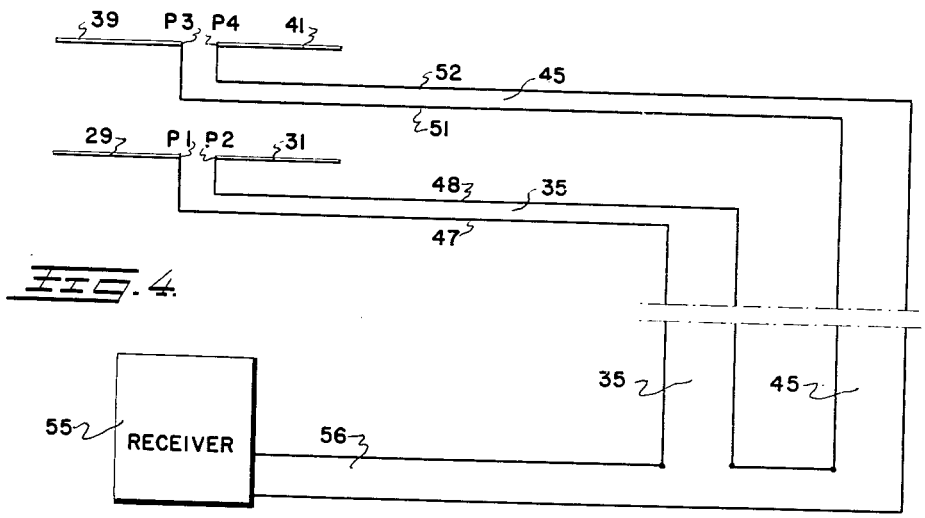
FIG. 4.
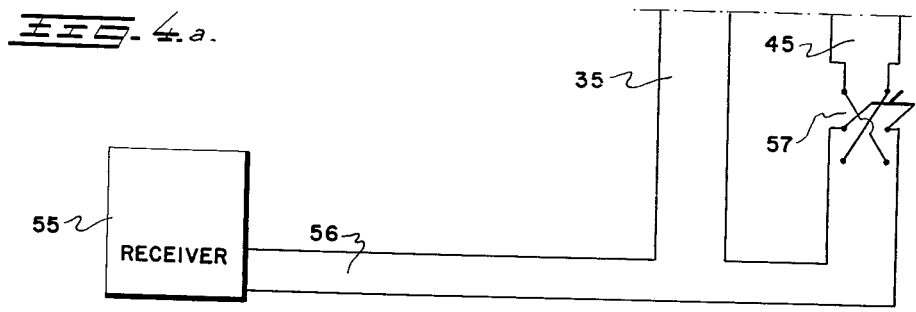
FIG. 4.a.
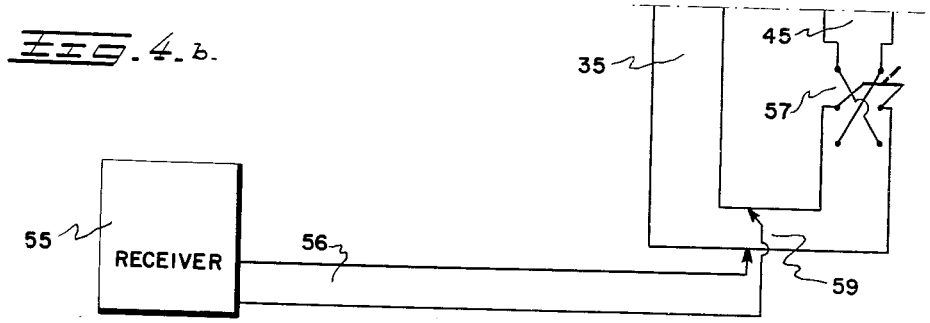
FIG. 4.b.
INVENTORS
ROLLIND O. HOLLOWAY
JOHN R. HOLLOWAY
BY Mead, Browne, Schuyler & Beveridge
ATTORNEY April 25, 1961  R. O. HOLLOWAY ET AL  2,981,834
INTERFERENCE REJECTION SYSTEM AND METHOD
USING TWO RELATIVELY ROTATABLE ANTENNAS
Filed Jan. 11, 1955                                7 Sheets-Sheet 4
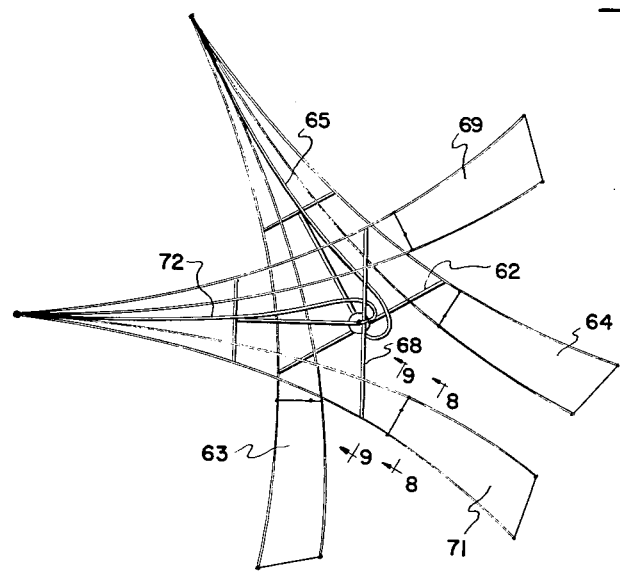
Fig. 6.
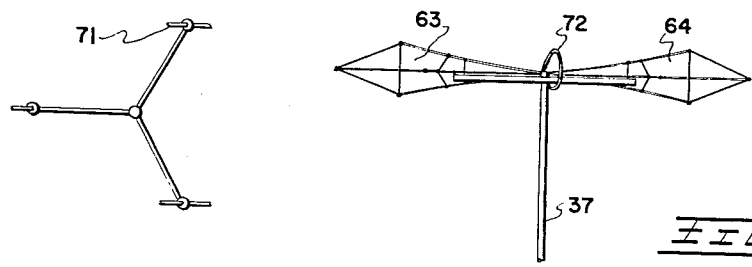
Fig. 8.                                              Fig. 7.
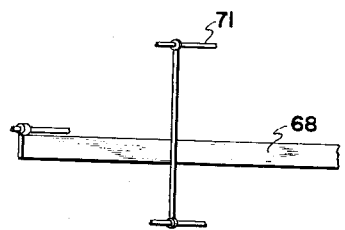
Fig. 9.
INVENTORS
ROLLIND O. HOLLOWAY
JOHN R. HOLLOWAY
BY Mead, Browne, Schuyler & Beveridge
ATTORNEY

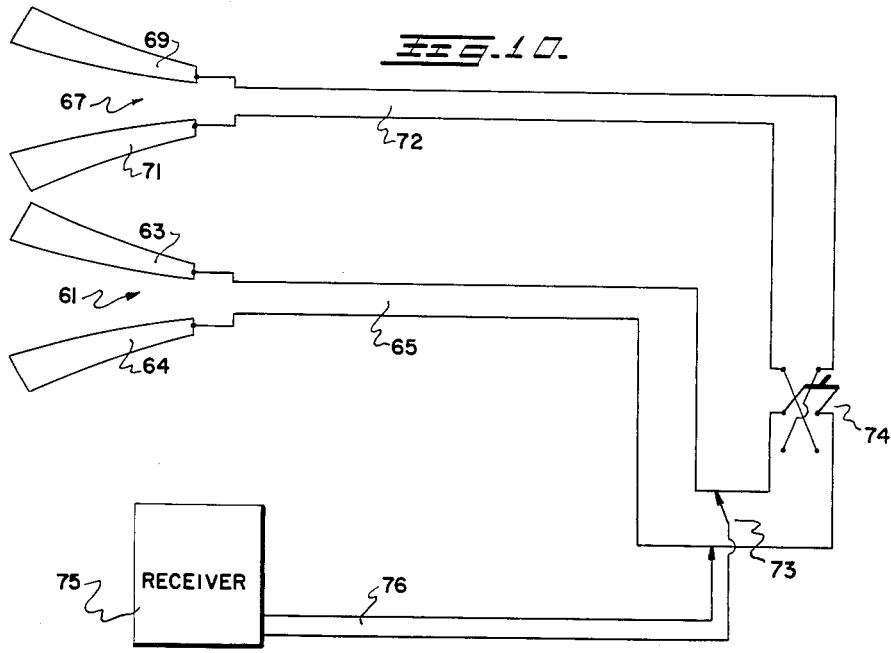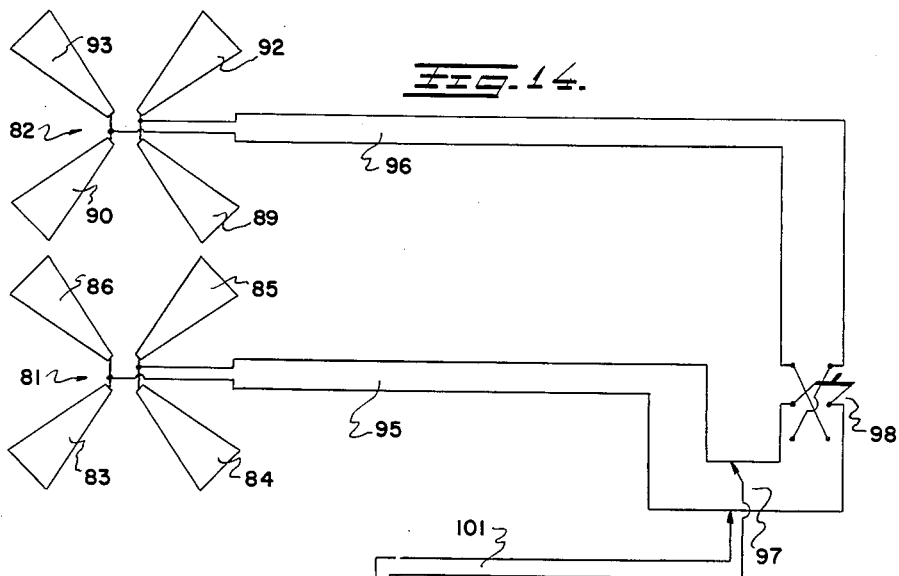

R. O. HOLLOWAY ET AL 2,981,834

INTERFERENCE REJECTION SYSTEM AND METHOD
USING TWO RELATIVELY ROTATABLE ANTENNAS

Filed Jan. 11, 1955

INVENTORS
ROLLIND O. HOLLOWAY
JOHN R. HOLLOWAY

BY
Mead, Browne, Schuyler & Beveridge
ATTORNEY

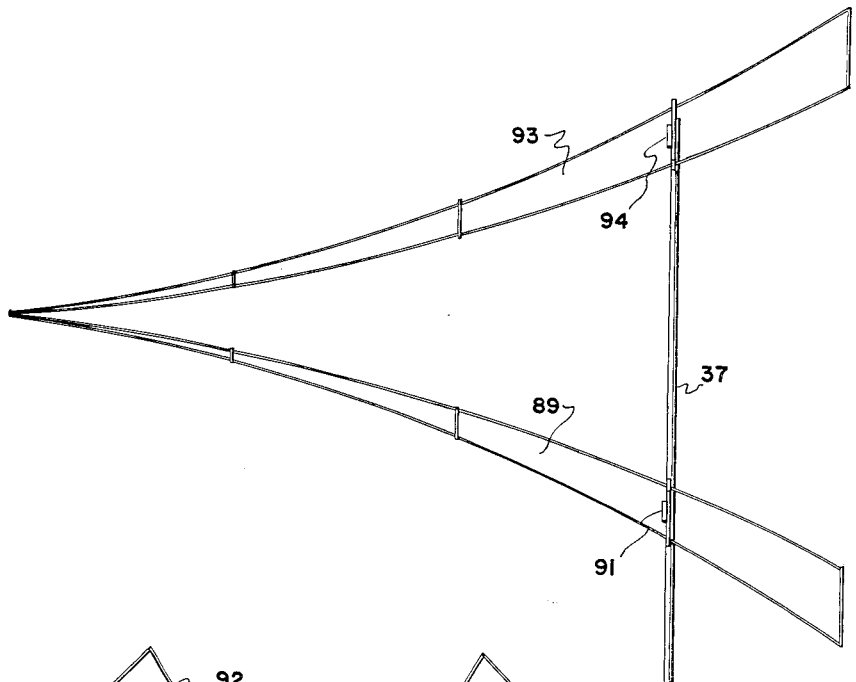
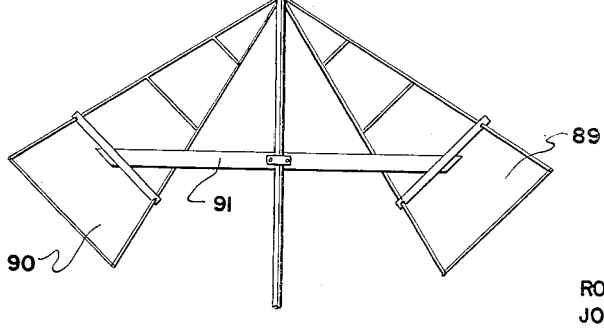

United States Patent Office 2,981,834
Patented Apr. 25, 1961

2,981,834

INTERFERENCE REJECTION SYSTEM AND METHOD USING TWO RELATIVELY ROTATABLE ANTENNAS

Rollind O. Holloway, 1910 Wiley St., and John R. Holloway, 2019 Mayo St., both of Hollywood, Fla.

Filed Jan. 11, 1955, Ser. No. 481,072

6 Claims. (Cl. 250—20)

This invention relates to directional antenna systems and particularly to directional antennas having a controllable interference pattern to produce infinite interference rejection characteristics.

One of the major problems of radio and television reception lies in the widespread interference encountered in these spectrums from sources other than the source of the wanted signal. This may be co-channel interference emanating from other stations broadcasting on the same frequency as the wanted signal, or from a strong local station operating on an adjacent or nearby frequency or channel which the receiver is unable to reject. Another type of interference commonly known as "ghosts" results from reflection and re-radiation of the wanted signal by objects and structures in the field. Inasmuch as it has a longer path than the primary signal, its phase differs from that of the primary signal and distortion occurs.

When any of these types of interference is of a major order, satisfactory reception of the wanted signal is impossible. In the case of color television, any interference, even though minor, destroys the color fidelity and cannot be tolerated. Highly directional antennas tend to minimize some of these types of interference, but there is no conventional antenna which meets the problem.

A major object of this invention is to provide a directional antenna system which, while accepting the wanted signal, effectively eliminates the above described types of interference by infinite rejection of the interfering and unwanted signal. The invention rests upon the principle of pattern multiplication through the use of at least two directional antennas in combination, the relative exciting phase of which is controlled through a switching device, either singly or in combination with a line stretcher, and whose relative far field phase angle and far field voltage amplitude with respect to a distant point of observation, are controlled by the relative positioning of the two antennas about a common axis. By properly controlling these factors, any interfering signal whatever the direction of its source can be eliminated from the composite pattern, allowing the wanted signal to be received.

According to the concept of our invention, two or more directional antennas of similar character or preferably the same design are employed, one of which is known as the reference antenna, the primary function of which is to receive the wanted signal; the other antenna being known as the interference antenna, one of the functions of which is to provide a cancelling voltage equal in amplitude and of opposite phase to that of the interfering signal received by the reference antenna. Combining the energy received by both antennas provides a complete cancellation or rejection of the interfering signal.

In the practical application of this concept, two vertically spaced directional antennas are similarly and preferably symmetrically disposed about a common vertical axis. The vertical spacing between the two antennas is subject to wide variation, depending on considerations hereinafter set forth.

Other objects and advantages and features of the invention will become apparent from the following specification taken in conjunction with the accompanying drawings wherein:

Fig. 1 is a perspective view of an antenna array used in one embodiment of the invention;

Fig. 2 is a side elevation of the antenna array shown in Fig. 1;

Fig. 3 is a horizontal section taken on the line 3—3 of Fig. 2;

Fig. 4 is a schematic diagram showing the transmission line system for the antenna array shown in Fig. 1;

Fig. 4a is similar to Fig. 4 with the addition of a phase reversing device;

Fig. 4b is similar to Fig. 4a with the addition of a device for changing the relative length of one of the transmission lines;

Fig. 6 is a top plan view of the antenna array shown in Fig. 5;

Fig. 7 is a side elevation of one of the antennas shown in Fig. 5;

Fig. 8 is a transverse section taken on the line 8—8 of Fig. 6;

Fig. 9 is a transverse section taken on the line 9—9 of Fig. 6;

Fig. 10 is a schematic diagram showing the transmission line and interconnecting device for use with the antenna array shown in Fig. 6;

Fig. 12 is a side elevation of one of the antennas shown in Fig. 11;

Fig. 13 is a front elevation of the antenna shown in Fig. 12; and

Fig. 14 is a schematic diagram showing the transmission line system for the antenna array shown in Fig. 11.

Figure 5:
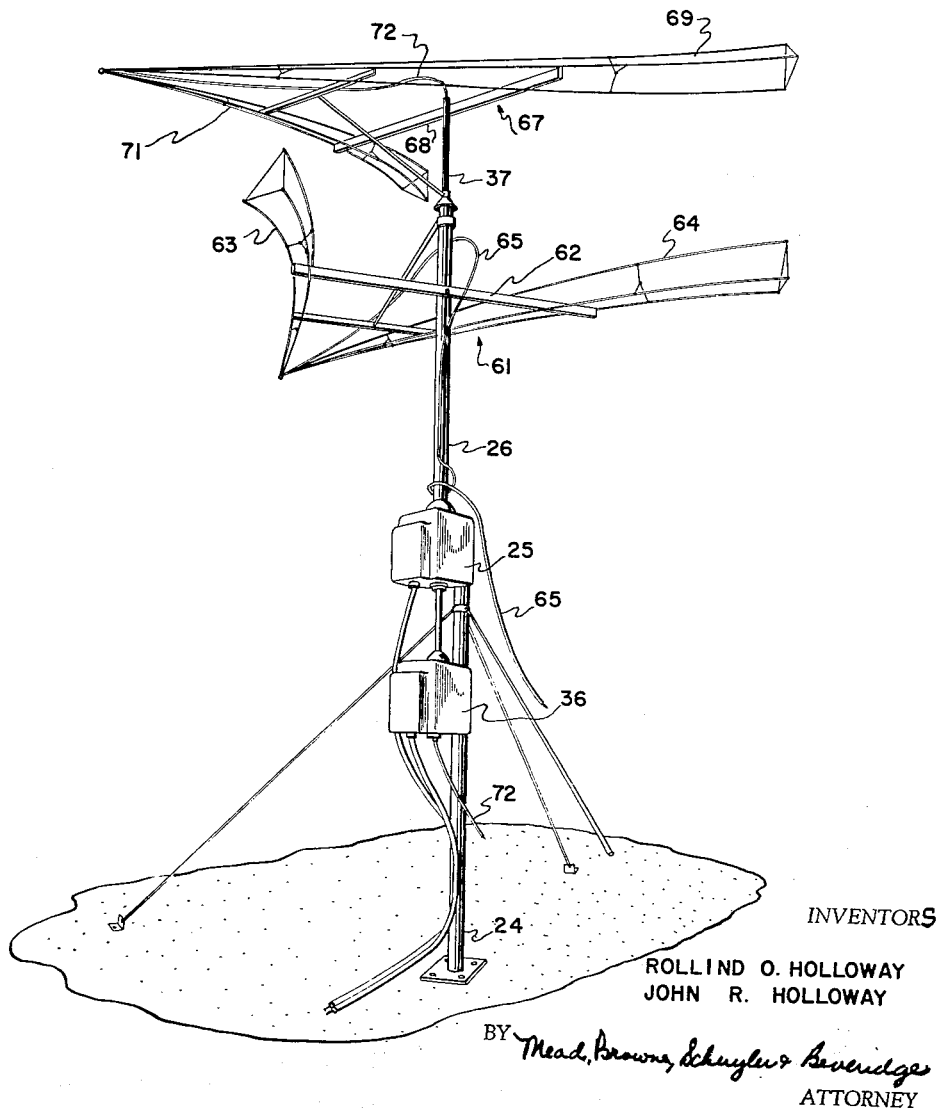
Fig. 5 is a perspective view of an antenna array utilizing antennas having constant directional radiation characteristics over a wide radiation bandwidth.

Referring now to the antenna array shown in Fig. 1, two identical directional antennas 21 and 22 are vertically spaced and mounted similarly and symmetrically with respect to the vertical axis of supporting shaft 23. Mast 24 is supported in a conventional manner and carries an antenna rotator motor 25 having a hollow shaft 26 supporting arms 27 and 28 extending in opposite directions to carry radiator elements 29 and 31 at one side with reflector elements 32 and 33 at the other side. The terminal ends of radiators 29 and 31 are connected to the ends of transmission line 35 which passes along the exterior of shaft 26 to the area of the translating device such as a receiver. Supported below antenna rotator 25 is a similar rotator 36 having a shaft 37 extending through hollow shaft 26 and carrying arms 38, 38 which respectively support radiator elements 39 and 41 at one side with reflector elements 42 and 43 at the other side. The terminal ends of radiators 39 and 41 are connected to transmission line 45 which enters through shaft 37 and extends to the area of the receiver. Antennas 21 and 22 are mounted similarly and symmetrically with respect to the vertical axis of shaft 23, and are vertically spaced so their horizontal axes lie in separate horizontal planes. Since the antennas 21 and 22 are substantially identical, they have similar characteristics, that is, similar radiation patterns at the same operating frequency.

Referring now to Fig. 4, terminal ends P1 and P2 of the radiator elements 29 and 31 are respectively connected to wires 47 and 48 of electrically balanced transmission line 35 and terminal ends P3 and P4 of the radiators 39 and 41 are respectively connected to wires 51 and 52 of electrically balanced transmission line 45. Transmission lines 35 and 45 are of the same electrical length and may be interconnected in series as shown in Fig. 4, or in parallel, for supplying energy to a receiver 55.

Although this system may be employed with the two antennas fixed in predetermined positions to eliminate specific interference, it is more useful and convenient to permit at least one of the antennas to rotate relative to the other and maximum versatility and effectiveness of the system is attained when rotors are provided for independently rotating the two antennas about the vertical axis as illustrated in Fig. 1.

With the receiving device 55 connected to the juncture of the two transmission lines, either directly or through a third transmission line 56, and the two antennas pointing in the same direction, the energy of a signal arriving at the system in a substantially horizontal plane and which is received by the one antenna will be equal in amplitude to that received by the other antenna. Depending on whether the antennas and their respective transmission lines supply these signals in phase or in phase opposition, the signal will be increased or cancelled. Assuming the phasing is opposed, both desired signals and interfering signals will be cancelled.

By directing the reference antenna (for example, antenna 21) at the desired station and rotating the interference antenna (for example, antenna 22) about the vertical axis of shaft 23 until it reaches the position where the energy received by it from an interfering station is equal in amplitude to that received by the reference antenna, but of opposing phase, the intefering signal will be cancelled out leaving only the desired signal. This condition of equal amplitude and opposing phase is satisfied when the two antennas are in a complementary position with respect to the direction of the interfering station, i.e., when the horizontal axes of the respective antennas lie in different vertical planes but make equal angles with lines extending from the common vertical axis to the interfering source. Since the two antennas are then in the same angular position with respect to the interfering source, the amplitude of the interfering signal received by each antenna is the same, the far field phase is identical and, since the two antennas are excited in phase opposition with respect to each other, complete rejection of the interfering signal takes place.

As a matter of convenience, the arrangement shown in Fig. 4a may be utilized where a switching device 57 is available to connect the transmission lines 35 and 45 so the system operates either in phase or in phase opposition; thus, the interfering signals derived from the two antennas are in phase opposition so the interfering signal from one antenna is balanced by the interfering signal from the other antenna with the resultant complete rejection of the interfering signal in the energy supplied to the receiver.

The far field voltage $E_0$ at any point of observation resulting from pattern multiplication by the two antennas of the system, is shown by the following expression:

$$E_0 = E_1 \angle \xi_1 + E_2 \angle \xi_2 + \delta$$

Where $E_0$ is the resultant far field voltage, $E_1$ and $E_2$ the far field voltage of the respective antennas, and $\angle \xi_1$ and $\angle \xi_2$ the far field phase angle of the respective antennas and $\delta$ being the difference in the exciting phase of the two antennas. From this, it will be seen that where $E_1 = E_2$, $\angle \xi_1 = \angle \xi_2$ and $\delta = 180°$, cancellation will occur. This situation is present when the antennas assume the complementary position aforedescribed.

However, high attenuation of the interfering signal can be obtained by setting the interference antenna at other than the complementary position. As its position is changed by rotation about the vertical axis, the value of its far field phase angle varies so that at some positions the conditions for high attenuation of the interfering signal are satisfied and virtual cancellation of the interference results.

Likewise, positions for the interference antenna will be found where the value of its far field phase angle in the direction of the wanted station is such that energy received by the interference antenna from the wanted station will serve to augment the gain of the antenna system. Where more than one interfering signal is encountered, relative positions for the antennas may be found where all interference is at a minimum, in which case the reference antenna may assume a position somewhat off the compass direction of the wanted station.

If by means of the switching device 57, the transmission lines are so connected that said system is operated "in phase," the system may be used as a "stacked" array with both antennas directed at the wanted station. Moreover, it can be employed to reject interference, although it is not generally effective for that purpose as when the system is operating out of phase. If an interfering signal is present, one of the antennas may be rotated to a position where the amplitude of the interfering signal received by one antenna is substantially equal to that received by the other and their relative far field phase angles in the direction of the interfering station are such as to produce high attenuation of the interfering signal, thus providing substantially interference free reception.

In order that this effect be obtained, the directional antennas employed in the system must be designed so that rotation of the antenna about a vertical axis produces variations in the far field phase angle. The vertical spacing between the two antennas is subject to wide variation depending upon the degree of vertical directivity. Where the antennas have relatively high vertical directivity, the spacing between them is not critical but can be varied over a wide range and spacing of the order of several wave lengths at the higher operating frequencies can be used. When the vertical directivity in the individual antennas employed is low, the spacing between the two antennas should be less.

As illustrated in Fig. 4b, a phase shifting device 59, in the nature of a line stretcher, may be employed to change the relative effective lengths of the transmission lines. In this way, the difference in exciting phase may be manually controlled. Instead of such difference in exciting phase of said antennas being fixed at 0° or 180° as is the case where the switching device 57 is used alone, by phase shifting device 59 such phase difference may be varied so that it assumes any desired value between the limits of 0° and 180°. Where $\delta = 0°$ the system operates "in phase" and where $\delta = 180°$ the system operates in opposing phase; where $\delta$ assumes any intermediate value the system is referred to as operating "out of phase." When so operating, relative positions will be found for the antennas which satisfy the conditions necessary for cancellation or high attenuation of the interfering signal. As the interference antenna is rotated, its far field phase angle in the direction of the interfering station changes and when a position is reached where the total phase difference of the two antennas approaches 180° and the amplitude of the interfering signal received by each antenna is substantially the same, cancellation occurs. Moreover, by setting the line stretcher so that the system operates "in phase," the two antennas can be used in combination to secure greater directivity and gain in the direction of the wanted signal. This means of controlling the difference in exciting phase of the two antennas may be used either alone or in combination with the switching device hereinbefore described and illustrated in Fig. 1. Such control of the exciting phase difference has practical advantages as frequently slight variations in such phase difference will effect complete cancellation of the interfering signal although the interfering antenna is not set at its most favorable position for cancellation.

It is also useful in meeting the requirements imposed for cancellation of a signal arriving at the system from a direction other than horizontal and in the situation where there is more than one source of interference and attenuation of both interfering signals is sought.

Since the effectiveness of the invention depends upon the directivity of the two antennas, particularly in the horizontal plane, directional antennas embodying the design disclosed in my co-pending application Serial No. 453,021, filed August 30, 1954, are particularly adaptable to the present antenna system having a controllable interference pattern. An antenna array utilizing a pair of two conductor antennas embodying the invention of my previously mentioned co-pending application is illustrated in Fig. 5 as supported on a mast and rotation system similar to that shown in Fig. 1. To avoid repetition, the same reference numerals have been applied to the same parts.

As shown in Fig. 5, antenna 61 is supported on shaft 26 by a cross-piece 62 and carries radiator elements 63 and 64 having their respective terminal ends connected to the ends of an electrically balanced transmission line 65. As described in the aforementioned co-pending application, this type of antenna has a constant directional radiation characteristic over a wide radiation bandwidth. An identical antenna 67 is supported on shaft 37 by cross-piece 68 with radiator elements 69 and 71 having their terminal ends respectively connected to the wires of an electrically balanced transmission line 72. As illustrated in Fig. 10, the relative effective lengths of transmission lines 65 and 72 may be varied through the medium of phase shifting device 73, such as a line stretcher, and the signals from antennas 61 and 67 may be connected in phase or in phase opposition through the medium of switching device 74, the two transmission lines 65 and 72 being interconnected and their juncture connected to receiver 75 as by a transmission line 76.

Since the antennas shown in Figs. 5-10, inclusive, have high vertical directivity, the vertical spacing between them is not critical.

Operation of this system is effective in the same manner as that previously described in connection with the form of the invention shown in Figs. 1-4, inclusive. However, by reason of the very high directional characteristic of the antennas 61 and 67, effective cancellation of an interfering signal may be more complete without modification of the desired signal.

Figure 11:
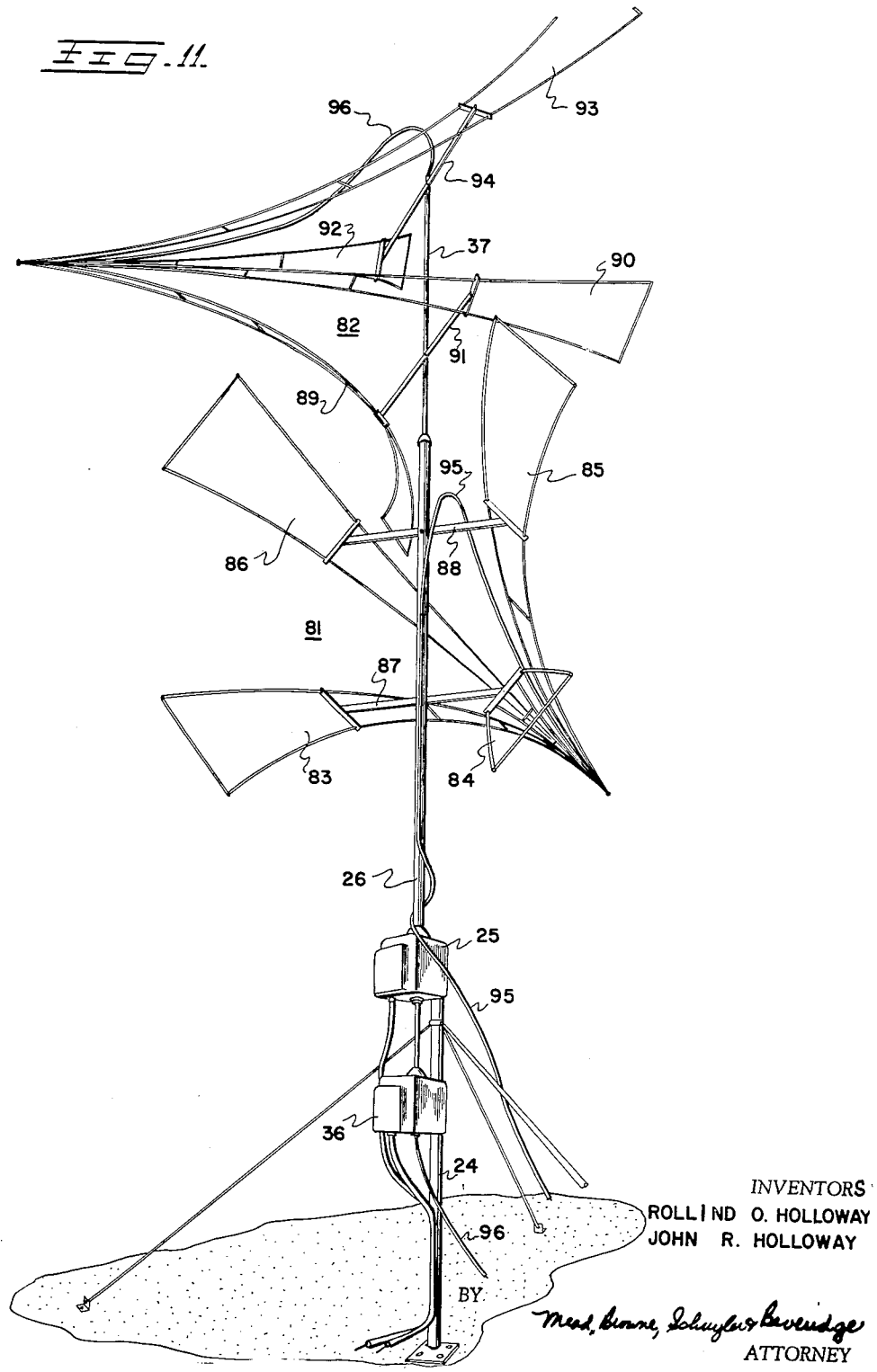
Fig. 11 is a perspective view of an antenna array embodying the invention and utilizing antennas having constant directional radiation characteristics over a wide radiation bandwidth with substantially equal directivity in the horizontal and vertical planes.

Also particularly adapted for use in the antenna system of the present invention is the four conductor antenna disclosed in my above-identified co-pending application Serial No. 453,021. An array embodying one form of this four conductor antenna is shown in Fig. 11. As in the previously described forms of the present invention, the array shown in Fig. 11 includes two vertically spaced antennas 81 and 82, both of which are highly directional and both of which are similarly and symmetrically disposed with the vertical axis of the shaft 37. Antenna 81 includes four radiator elements 83, 84, 85 and 86 carried by cross-pieces 87 and 88 on the shaft 26. Antenna 82 is identical in that its lower elements 89 and 90 are supported on cross-piece 91 and its upper elements 92 and 93 are supported on a cross-piece 94 on the shaft 37. As shown schematically in Fig. 14, elements 83 and 86 of the antenna 81 are connected together and connected to one end of one wire of electrically balanced transmission line 95. The ends of the other two radiator elements 84 and 85 are likewise connected together and connected to the other wire of transmission line 95. Similarly, antenna 82 has its elements 90 and 93 connected together and to one side of transmission line 96 with elements 89 and 92 connected together and to the other side of transmission line 96. With the antenna elements connected as shown in Fig. 14, each of the antennas 81 and 82 is horizontally polarized; for vertical polarization, the two upper elements and the two lower elements are respectively connected together.

A phase shifting device 97 is connected in the transmission line 96, so the lines 95 and 96 being of substantially equal effective length, the relative phasing may be adjusted or varied by phase shifter 97. In phase and phase opposition, conditions may be accomplished by switch 98 with the two transmission lines interconnected for supplying a signal by transmission line 101 to a receiver 102.

This four element antenna system, as described in my co-pending application, has a constant directional radiation characteristic over a wide radiation bandwidth as well as substantial equal directivity in the horizontal and vertical planes. Hence, the two antennas included in the array shown in Fig. 11 have, in addition to a constant directional radiation characteristic over a wide radiation bandwidth, substantially equal directivity in planes normal to each other. As arranged in Fig. 11, these are the horizontal and vertical planes.

While three different types of antennas have been illustrated and described in systems embodying this invention, it is to be understood that the system may employ a pair of directional antennas of any type. When antennas of different design having different field patterns are used in this system, performance of the system is less satisfactory.

In those instances where the system is to be used mainly to eliminate interference, the two transmission lines may be permanently connected so that the system operates in opposing phase. Thus, the arrangement illustrated in Fig. 4b may be utilized in the systems shown schematically in Figs. 10 and 14.

While there have been shown and described particular embodiments of the invention, it will be obvious to those skilled in the art that various changes and modifications may be made therein without departing from the invention, and therefore, it is aimed to cover all such changes and modifications as fall within the true spirit and scope of the invention, as defined in the following claims.

What we claim as our invention is:

1. The method of receiving a desired signal and rejecting interfering signals received by a directional reference antenna which comprises moving the reference antenna about a vertical axis to receive a desired signal, angularly rotating a directional interference antenna having directional characteristics similar to the reference antenna about said vertical axis relative to the angular position of said reference antenna to a position where the amplitude of the interfering signals received by said interference antenna is substantially equal to the interfering signals received by said reference antenna, and combining the signals received by the two antennas so the interfering signals are in phase opposition.

2. The method of receiving desired signals and rejecting interfering signals comprising the steps of rotating a reference antenna about a vertical axis to a location to receive the desired signal, rotating a directional interference antenna about said vertical axis to an angular position with respect to the reference antenna where the amplitude of the interfering signal received by the directional interference antenna is substantially equal to the amplitude of the interfering signal received by said reference antenna, and combining the received signals in phase opposition.

3. The method of receiving a desired signal and rejecting interfering signal comprising the steps of angularly moving a directional reference antenna about a vertical axis to receive the desired signal, moving a directional interference antenna having directional characteristics similar to said reference antenna about said vertical axis relative to said reference antenna to a position where the horizontal axes of the respective antennas lie in different vertical planes making equal angles with a line extending through the common vertical axis to the interfering source and the interfering signals received by the two antennas are of substantially equal amplitude, and combining the signals received by the two antennas in phase opposition.

4. An antenna system for receiving a desired signal and rejecting an interfering signal comprising a first directional antenna and a second directional antenna each mounted for rotation about a common vertical axis and disposed symmetrically with respect to said vertical axis, said two antennas being vertically spaced and having similar characteristics, a pair of electrically balanced transmission lines each respectively connected at one end to one of said directional antennas and connected at their other ends to each other, and means for relatively rotating one of said two antennas about said vertical axis so that the interfering signals received by each of said antennas is of equal amplitude.

5. An antenna system for receiving a desired signal and rejecting an interfering signal comprising a pair of directional antennas having similar characteristics mounted for rotation about a common vertical axis, said antenna being vertically spaced and symmetrically disposed with respect to said vertical axis, a pair of electrically balanced transmission lines each respectively connected at one end to one antenna and connected to each other at their other ends, means for rotating said first antenna about said vertical axis to orient said first antenna with respect to a desired signal, and means for rotating said second antenna about said vertical axis to receive an interfering signal of a magnitude substantially equal to the magnitude of the interfering signal picked up by said first antenna.

6. The method of receiving a desired signal and rejecting an interfering signal which comprises moving a directional reference antenna about a vertical axis to a location to receive the desired signal, moving a directional interference antenna about said vertical axis angularly with respect to said reference antenna to receive the interfering signal in substantially equal amplitude as undesired signal received by the reference antenna, and combining the signals received by the two antennas in phase opposition.

References Cited in the file of this patent
UNITED STATES PATENTS

| | | |
|---|---|---|
| 1,350,100 | Hogan | Aug. 17, 1920 |
| 1,468,062 | Weagent | Sept. 18, 1923 |
| 1,500,476 | Wreeland | July 8, 1924 |
| 1,654,573 | Richmond | Jan. 3, 1928 |
| 1,855,184 | Fisher | Apr. 26, 1932 |
| 2,046,849 | Runge | July 7, 1936 |
| 2,063,534 | Wallace | Dec. 8, 1936 |
| 2,117,680 | Robinson | May 17, 1938 |
| 2,187,015 | Cork | Jan. 16, 1940 |
| 2,256,619 | Luck | Sept. 23, 1941 |
| 2,280,738 | Bace | Apr. 21, 1942 |
| 2,307,184 | Alford | Jan. 5, 1943 |
| 2,407,659 | Fuchs | Sept. 17, 1946 |
| 2,498,957 | Jordon | Feb. 28, 1950 |
| 2,571,129 | Hansen | Oct. 16, 1951 |
| 2,605,417 | Andrews | July 29, 1952 |
| 2,804,618 | Carpenter | Aug. 27, 1957 |

OTHER REFERENCES

Nelson: "Television Antennas, Design, Construction, Installation and Trouble-Shooting Guide," pages 55–57, copyright 1951, published by Howard W. Sames & Co., Inc., Indianapolis, Indiana.

UNITED STATES PATENT OFFICE
CERTIFICATE OF CORRECTION

Patent 2,981,834                                            April 25, 1961

Rollind O. Holloway et al.

It is hereby certified that error appears in the above numbered patent requiring correction and that the said Letters Patent should read as corrected below.

Column 5, line 9, strike out "my"; line 10, after "August 30, 1954," insert -- in the name of John Rolind Holloway --; lines 13 and 49, for "my", each occurrence read -- the --; column 6, line 9, for "my" read -- the above-mentioned --.

Signed and sealed this 14th day of November 1961.

(SEAL)
Attest:

ERNEST W. SWIDER                                                DAVID L. LADD
Attesting Officer                                                  Commissioner of Patents

USCOMM-DC